T. E. MURRAY.
SHEET METAL ROD OR SHAFT.
APPLICATION FILED DEC. 14, 1916.

1,223,089.

Patented Apr. 17, 1917.

Inventor
Thomas E. Murray
By his Attorney

UNITED STATES PATENT OFFICE.

THOMAS E. MURRAY, OF NEW YORK, N. Y.

SHEET-METAL ROD OR SHAFT.

1,223,089.

Specification of Letters Patent.

Patented Apr. 17, 1917.

Application filed December 14, 1916. Serial No. 136,856.

*To all whom it may concern:*

Be it known that I, THOMAS E. MURRAY, a citizen of the United States, residing at New York, in the county of New York and State of New York, have invented a certain new and useful Improvement in Sheet-Metal Rods or Shafts, of which the following is a specification.

The invention is a rod or shaft built up of successive circular sections of struck up sheet metal united by electrically welded joints. The object is to produce a light and strong rod or shaft which may be used without machining for any purpose for which rods or shafts of corresponding strength but otherwise constructed may be employed.

In the accompanying drawings—

Figure 1:
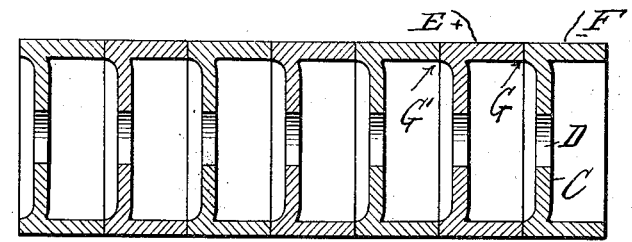
Figure 2:
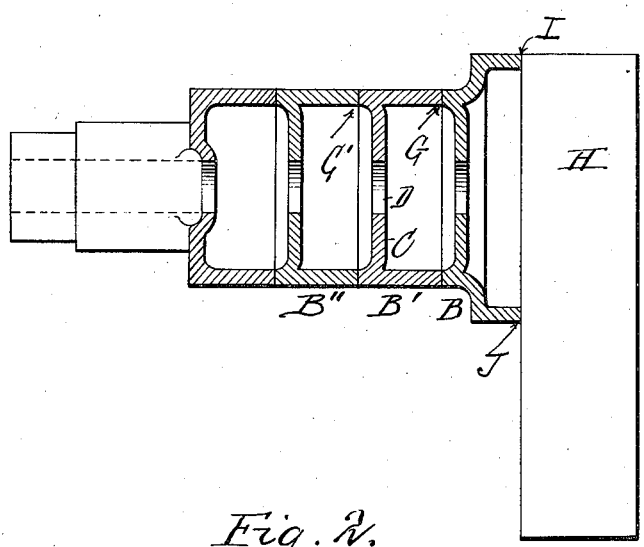

Figure 1 shows my rod or shaft in longitudinal section. Fig. 2 shows said shaft provided with an enlarged end section forming a flange, which end section is attached to another object, such as a crank arm.

Similar letters of reference indicate like parts.

The shaft A, Fig. 1, is formed of a series of rings B, B', etc., placed successively edge to edge. Within and integral with each ring is a partition C preferably having a central opening D, which openings are in line when the rings are assembled. Said rings with their partitions are struck up or stamped from sheet metal. In constructing the shaft, I first place two rings, as B, B', together, and connect to said rings, respectively, terminals E, F from any suitable source of welding current. In this way, I produce electrically welded joints at G between the edges of the rings B, B'. I may then add a third ring B'', and by connecting the circuit terminals to said ring and to ring B', I make welded joints between ring B'' and ring B' at G'. I continue adding rings and electrically welding them in place until a shaft of the desired length is obtained. As shown in Fig. 1, the rings B, B', etc., are all of like diameter, and, therefore, a shaft everywhere of uniform diameter may be formed from such rings.

Where the shaft is to be flanged or enlarged at the end for attachment to some other object—as, for example, a crank arm H, Fig. 2—I increase the diameter of the outer edge I of the end ring B, while retaining that of the inner edge unaltered to register with the edge of ring B' to form the joint at G. The enlarged edge I is welded to the face of the crank arm H at J.

The shaft thus produced is light and strong. The welds are made in a small fraction of a second each, and as soon as they are done, the shaft is ready for use, without machining.

I claim:

1. A rod or shaft of uniform diameter formed of a plurality of rings of struck up sheet metal and of like diameter placed successively edge to edge and united at said edges by electrically welded surfaces.

2. A rod or shaft formed of a plurality of rings of struck up sheet metal having transverse partitions, the said rings being placed successively edge to edge and united at said edges by electrically welded surfaces.

3. A rod or shaft as in claim 1, in combination with a ring at the end of said shaft having its outer edge of a diameter greater than that of its inner edge.

In testimony whereof I have affixed my signature in presence of two witnesses.

THOMAS E. MURRAY.

Witnesses:
 GERTRUDE T. PORTER,
 MAY T. McGARRY.